US008500005B2

(12) United States Patent
Amor et al.

(10) Patent No.: US 8,500,005 B2
(45) Date of Patent: Aug. 6, 2013

(54) METHOD AND SYSTEM FOR SURVEYING USING RFID DEVICES

(75) Inventors: Miguel Amor, Thornton, CO (US); Martin Holmgren, Boulder, CO (US); Nigel Peter Hanson, Christchurch (NZ); James M. Janky, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/225,014

(22) Filed: Sep. 2, 2011

(65) Prior Publication Data

US 2012/0229262 A1 Sep. 13, 2012

Related U.S. Application Data

(63) Continuation-in-part of application No. 12/123,973, filed on May 20, 2008, and a continuation-in-part of application No. 12/566,093, filed on Sep. 24, 2009.

(51) Int. Cl.
*G06F 17/00* (2006.01)
*H04Q 5/22* (2006.01)

(52) U.S. Cl.
USPC .......... 235/375; 235/383; 340/10.1; 340/10.6

(58) Field of Classification Search
USPC ................ 235/375, 451, 492, 383, 472.02; 340/10.1, 10.6, 10.51
See application file for complete search history.

(56) References Cited

U.S. PATENT DOCUMENTS

| | | | |
|---|---|---|---|
| 3,916,821 A | 11/1975 | Pies | |
| 5,076,690 A | 12/1991 | DeVos et al. | |
| 5,270,936 A | 12/1993 | Fukushima et al. | |
| 5,471,218 A | 11/1995 | Talbot et al. | |
| 5,739,785 A | 4/1998 | Allison et al. | |
| 5,825,298 A | 10/1998 | Walter | |
| 5,837,986 A | 11/1998 | Barile et al. | |
| 5,923,287 A | 7/1999 | Lennen | |
| 6,078,251 A | 6/2000 | Landt et al. | |
| 6,504,503 B1 | 1/2003 | Saint-Hilaire et al. | |
| 6,529,828 B1 | 3/2003 | Williams et al. | |
| 6,621,417 B2 | 9/2003 | Duncan et al. | |
| 6,700,533 B1 | 3/2004 | Werb et al. | |
| 6,738,697 B2 | 5/2004 | Breed | |

(Continued)

FOREIGN PATENT DOCUMENTS

| | | |
|---|---|---|
| JP | 730644 A | 11/1995 |
| JP | 9-68429 A | 3/1997 |
| JP | 2007-198867 A | 8/2007 |
| KR | 2005-0116587 A | 12/2005 |

OTHER PUBLICATIONS

"Surveying", Wikipedia, downloaded from http://en.wikipeida.org.wiki/Surveying on Jul. 8, 2011, 10 pages.

(Continued)

*Primary Examiner* — Tuyen K Vo
(74) *Attorney, Agent, or Firm* — Kilpatrick Townsend & Stockton LLP

(57) ABSTRACT

A method of surveying includes detecting an RFID tag associated with a position of interest and decoding information stored in the RFID tag to extract data associated with the position of interest. The method also includes presenting the data associated with the position of interest to an operator of a surveying tool.

44 Claims, 10 Drawing Sheets

(56) References Cited

U.S. PATENT DOCUMENTS

| | | | |
|---|---|---|---|
| 6,738,712 B1 | 5/2004 | Hildebrant | |
| 6,747,560 B2 * | 6/2004 | Stevens, III | 340/572.4 |
| 6,774,811 B2 | 8/2004 | Kaufman et al. | |
| 6,847,896 B1 | 1/2005 | Orban et al. | |
| 6,874,238 B2 | 4/2005 | Cline | |
| 6,975,229 B2 | 12/2005 | Carrender | |
| 7,100,825 B2 | 9/2006 | Levine | |
| 7,319,387 B2 | 1/2008 | Willson et al. | |
| 7,325,737 B2 | 2/2008 | Epshteyn et al. | |
| 7,386,276 B2 | 6/2008 | Sama et al. | |
| 7,511,662 B2 | 3/2009 | Mathews et al. | |
| 7,841,513 B1 * | 11/2010 | Katzer et al. | 235/375 |
| 7,947,944 B2 | 5/2011 | Talbot | |
| 8,348,166 B2 | 1/2013 | Hanson | |
| 2002/0008621 A1 | 1/2002 | Barritz et al. | |
| 2002/0089675 A1 * | 7/2002 | Kamon et al. | 356/623 |
| 2003/0234293 A1 * | 12/2003 | Sauve et al. | 235/492 |
| 2004/0111911 A1 | 6/2004 | Scannell | |
| 2004/0234123 A1 | 11/2004 | Shirai et al. | |
| 2005/0027453 A1 | 2/2005 | Fort et al. | |
| 2005/0211777 A1 | 9/2005 | Wetzel et al. | |
| 2005/0222767 A1 | 10/2005 | Odamura | |
| 2005/0228614 A1 * | 10/2005 | Usbeck et al. | 702/179 |
| 2006/0006240 A1 | 1/2006 | Singleton | |
| 2006/0109131 A1 | 5/2006 | Sen et al. | |
| 2006/0136129 A1 | 6/2006 | Yokozawa | |
| 2006/0162207 A1 | 7/2006 | Morton et al. | |
| 2006/0184013 A1 | 8/2006 | Emanuel et al. | |
| 2006/0220955 A1 | 10/2006 | Hamilton | |
| 2006/0289635 A1 * | 12/2006 | Lin | 235/383 |
| 2007/0008129 A1 * | 1/2007 | Soliman | 340/572.1 |
| 2007/0081168 A1 | 4/2007 | Johnston | |
| 2007/0087866 A1 | 4/2007 | Meadows et al. | |
| 2007/0197229 A1 | 8/2007 | Kalliola et al. | |
| 2007/0258647 A1 * | 11/2007 | Usbeck et al. | 382/199 |
| 2007/0291303 A1 | 12/2007 | Tanaka et al. | |
| 2008/0074638 A1 | 3/2008 | Sakimura et al. | |
| 2008/0082701 A1 | 4/2008 | Pavel et al. | |
| 2009/0180667 A1 | 7/2009 | Mahan et al. | |
| 2009/0289120 A1 * | 11/2009 | Hanson | 235/462.1 |
| 2010/0109844 A1 * | 5/2010 | Carrick et al. | 340/10.1 |
| 2010/0229415 A1 * | 9/2010 | Knudsen | 33/613 |
| 2011/0068164 A1 | 3/2011 | Hanson | |

OTHER PUBLICATIONS

Non-Final Office Action for U.S. Appl. No. 12/123,973 mailed on May 26, 2010, 8 pages.

Final Office Action for U.S. Appl. No. 12/123,973 mailed on Dec. 8, 2010, 9 pages.

Advisory Action for U.S. Appl. No. 12/123,973 mailed on Mar. 24, 2011, 3 pages.

Non-Final Office Action for U.S. Appl. No. 12/123,973 mailed on Apr. 15, 2011, 8 pages.

Non-Final Office Action for U.S. Appl. No. 12/123,973 mailed on Oct. 17, 2011, 7 pages.

Non-Final Office Action for U.S. Appl. No. 12/566,093 mailed on Sep. 14, 2011, 10 pages.

Final Office Action for U.S. Appl. No. 12/123,973 mailed on Feb. 17, 2012, 9 pages.

Notice of Allowance for U.S. Appl. No. 12/123,973 mailed on Jun. 7, 2012, 8 pages.

Notice of Allowance for U.S. Appl. No. 12/123,973 mailed on Sep. 11, 2012, 11 pages.

Final Office Action for U.S. Appl. No. 12/566,093 mailed on Feb. 9, 2012, 13 pages.

Non-Final Office Action for U.S. Appl. No. 12/566,093 mailed on Apr. 25, 2012, 16 pages.

Final Office Action for U.S. Appl. No. 12/566,093 mailed on Sep. 19, 2012, 12 pages.

Non-Final Office Action for U.S. Appl. No. 12/566,093 mailed on Jun. 5, 2013, 18 pages.

* cited by examiner

METHOD AND SYSTEM FOR SURVEYING USING RFID DEVICES

CROSS-REFERENCES TO RELATED APPLICATIONS

The present application is a continuation-in-part of U.S. patent application Ser. No. 12/123,973, filed on May 20, 2008, and Ser. No. 12/566,093, filed on Sep. 24, 2009, the disclosures of which are hereby incorporated by reference in their entirety for all purposes.

BACKGROUND OF THE INVENTION

The present invention relates in general to a method and apparatus for surveying and more particularly to providing data associated with a position of interest. More particularly, embodiments of the present invention relate to surveying and detecting an RFID tag associated with an item at a position of interest and determining position data for the position of interest. The invention has wider applicability than this example and other applications are included within the scope of the present invention.

Conventional methods and devices for surveying typically utilize surveying markers to provide positioning information. For example, permanent or temporary markers such as wooden stakes or painted symbols may be used to mark a boundary of a plot of land. However, such markers are limited in their ability to provide data associated with the position. Similarly, surveying targets are also limited in their ability to provide information associated with a particular location. Additionally, devices currently available for surveying and identifying positions of interest are not configured to distinguish between the conventional markers. For example, many surveying devices employ a surveying pole placed at the location of a conventional survey stake. Because these conventional methods are typically performed with a surveying pole, the conventional systems for performing surveying and positioning measurements do not require survey markers to provide additional information. One disadvantage of such an approach may be difficulty in identifying surveying marks. Another disadvantage may be increased time required for performing a surveying measurement.

Thus, there is a need in the art for a method and apparatus for improved measurement and identification of items of interest.

SUMMARY OF THE INVENTION

According to embodiments of the present invention, methods and systems related to surveying with a survey target are provided. In one embodiment, a method is provided including detecting an RFID tag associated with a position of interest. The RFID tag can be decoded to extract data associated with the position of interest. Decoded data associated with the position of interest can be presented to an operator of a surveying tool.

According to other embodiments of the present invention, methods and systems related to detection of RFID data of at least one item of interest are provided. In one embodiment, a method includes detecting an RFID tag, by an RFID reader, associated with an item located at a position of interest. The method further includes, decoding data stored in the RFID tag to extract data associated with the item, determining position data for the position of interest and displaying the data associated with the item and the position data for a user.

According to one embodiment, one or more items may be marked with an RFID tag, including but not limited to a surveying stake, a permanent marker, a mobile device, or the like. A surveying measurement and/or positioning measurement may then be performed for the position of interest. As used herein, a position of interest may refer to a particular global position or target area. For example, a position of interest may relate to a position marked by a surveying marker. Similarly, the position of interest may relate to the location of a moveable item. Detection and decoding of the RFID tag may be performed by an RFID tag reader. In one embodiment, measurement data may be stored and/or displayed to a user based on data encoded in an RFID tag. Further, one or more measurements may be performed following detection and identification of an RFID tag.

The present disclosure further relates to a device configured for detection of an RFID tag. In one embodiment, the device includes an RFID tag reader/writer configured to detect one or more RFID tags as well as to write data to the one or more RFID tags. The device may be configured to display data to a user based on one or more RFID tags and provide decoded data to a user. According to another embodiment, the device may be configured to determine position data for the position of interest. Measurement results may be compared to decoded RFID tag data to determine changes associated with the position of interest.

For example, a change in elevation, and/or global position, of the position of interest may be determined by the device. The device may further include a wired and/or wireless link to a processing station or server for post-processing of collected surveying data. To that end, the device may provide automated monitoring of an item at a position of interest.

Another aspect of the invention is directed to a process for identifying one or more items of interest based on a detected RFID tag. According to one embodiment, a device configured for detection of an RFID tag may be configured to display a target window identifying a detected RFID tag. The device may be configured to decode an RFID tag based on a user selection.

Another embodiment of the invention is to provide a surveying tool configured to detect and decode an RFID tag associated with at least one position of interest. The surveying tool may further be configured to provide decoded data to a user of the surveying tool. According to another embodiment, the surveying tool may be configured to perform a surveying measurement for the position of interest. Measurement results may then be compared to decoded RFID tag data to determine changes associated with the position of interest. For example, a change in elevation, and/or global position, of the position of interest may be determined by the survey controller.

According to another embodiment, a process is provided for performing a surveying measurement including at least one RFID tag associated with a position of interest. The process may include performing a surveying measurement for at least one position of interest and encoding a result of the surveying measurement into an RFID tag. According to another embodiment, the process may include decoding an RFID tag associated with a position of interest and presenting decoded data to a user.

Another aspect of the invention is directed to a system for performing surveying measurements for a position of interest labeled with an RFID tag. In one embodiment, the system may include a surveying tool in communication with at least one target associated with the position of interest.

Other aspects, features, and techniques of the invention will be apparent to one skilled in the relevant art in view of the following detailed description of the invention.

DETAILED DESCRIPTION OF THE INVENTION

Embodiments of the present invention relate to methods and systems for providing information for a position of interest. As used herein, a position of interest may refer to a particular global position, such as a position marked by a surveying marker. In one embodiment, a surveying measurement may be performed for the position of interest. The measurement data may be encoded in an RFID tag. According to another embodiment, the position of interest can be labeled with the RFID tag. Further, the RFID tag may be used as a surveying target by the surveying tool.

Since RFID readers operate using radio transmitter/receiver technology in contrast with optical transmitter/receiver technology used in and barcode readers, embodiments of the present invention provide advantages not available using barcode-based systems. For example, one advantage provided by embodiments of the present invention is that the alignment of an RFID tag reader generally only relies on a straight line between the reader and the RFID tag, whereas a barcode reader also needs to have the reader and barcode target in a substantially "head-to-head" alignment. Therefore, although some tilting of a barcode reader plane from the same orientation as the barcode target plane is possible, these systems work much better when the reader is a few inches away from the barcode, with tilting of the reader/target deteriorating the reading ability as the distance increases. Of particular importance in surveying application, RFID systems can operate when the RFID tag is obscured by dirt or other objects, whereas a barcode targets has to be "in the clear" and visible, not obscured by dirt. Thus, RFID systems provide benefits not available using barcode-only systems including the ability to work over large distances, are independent of face-to-face alignment between the reader and RFID tag, and are suitable for use in applications in which the RFID tag and/or the reader are in motion during detection.

Figure 1:
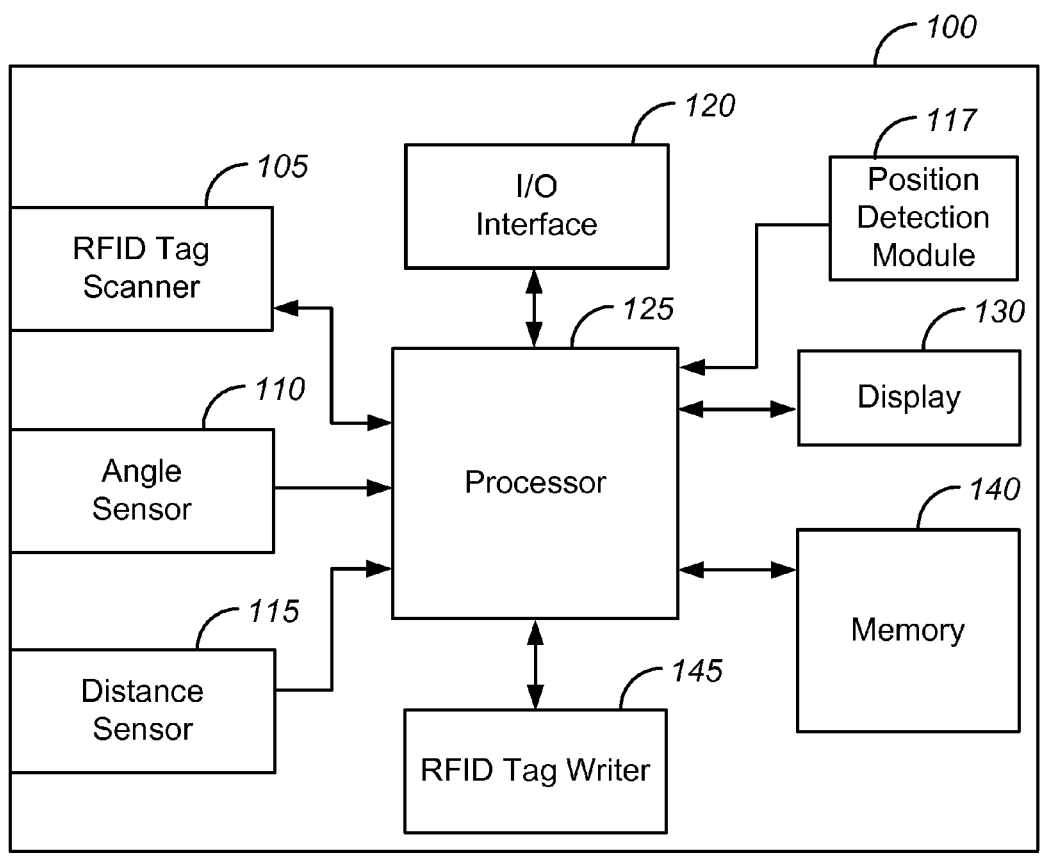
FIG. 1 depicts a simplified block diagram of a surveying tool according to one or more embodiments of the invention.

Referring now to the drawings, FIG. 1 illustrates a simplified block diagram of a surveying tool according to one or more embodiments of the invention. As shown in FIG. 1, surveying tool 100 includes an RFID tag scanner 105 coupled to processor 125. RFID tag scanner 105 can be configured to detect an RFID tag associated with a position of interest. To that end, RFID tag scanner 105 may be configured to detect an RFID tag associated with a position of interest within the range of 1 to 150 feet. However, it also may be appreciated that RFID tag scanner 105 may be configured to operate in other ranges.

According to another embodiment, surveying tool 100 can determine surveying data associated with a position of interest. As shown, device 100 includes a position detection module 117. Position detection module 117 may include or interact with an angle sensor 110 to determine angular position of a position of interest in relation to device 100 and a distance sensor 115 to detect distance to the position of interest. Alternatively, or in combination, position detection module 117 may be configured to determine global positioning coordinates (e.g., Global Navigation Satellite Systems (GNSS), Global Positioning System (GPS), Galileo Satellite Navigation System, or the Compass Global Satellite Navigation System).

Angle sensor 110 may provide one or more output signals associated with the angular position of a position of interest in relation to surveying tool 100. Distance sensor 115 may provide one or more output signals indicating the distance to a position of interest from the surveying tool 100. Position detection module 117 may include one or more elements operable to detect a position of the surveying tool 100, for example, a GPS-based position sensor. Output from angle sensor 110, distance sensor 115, and/or position detection module 117 may be collected by processor 125 to determine at least one of an elevation, grade, or surveying data in general. Processor 125 can output measurement data and/or data received from RFID tag scanner 105 using I/O interface 120. According to embodiments of the present invention, processor 125 can be any type of processor such as a microprocessor, field programmable gate array (FPGA) and/or application specific integrated circuit (ASIC). Measurement data can be stored by memory 140. Memory 140 can be any type of memory, such as a ROM or RAM memory. It may also be appreciated that measurement data collected by surveying tool 100 may be presented to a user by display 130.

When implemented in software, the elements of the invention are essentially the code segments to perform the necessary tasks. The program or code segments can be stored in a processor-readable medium. The processor-readable medium, also referred to as a computer-readable medium may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

According to another embodiment, device 100 may relate to an optical total station, such as the Trimble™ VX Spatial Station. The Trimble™ VX Spatial Station can employ a camera and/or electronic telescope as an imaging device to observe a target area where items of interest are located. In certain embodiments, an RFID reader may be electrically coupled to one of the telescope display or the camera display to detect both a barcode and an RFID tag in a target area. In this way, the recognition range of RFID tags on a distant target may be increased dramatically. As a result, device 100 can identify RFID tags at greater distances. Device 100 may further be configured to detect RFID data of at least one item of interest as will be described in more detail throughout the present specification. In yet another embodiment, device 100 may relate to a Geographic Information System (GIS) device which may be configured to detect one or more RFID tags as will be discussed in more detail throughout the present specification.

As described above, surveying tool 100 may be configured to determine a surveying measurement for a position of interest labeled with an RFID tag. However, it may also be appreciated that surveying tool 100 can determine at least one surveying measurement for a position of interest and store data associated with the position of interest using optional RFID tag writer 145. Optional RFID tag writer 145 may be configured to store data in an RFID tag already present on an item or a new RFID tag that can be affixed to an item.

Figure 2A:
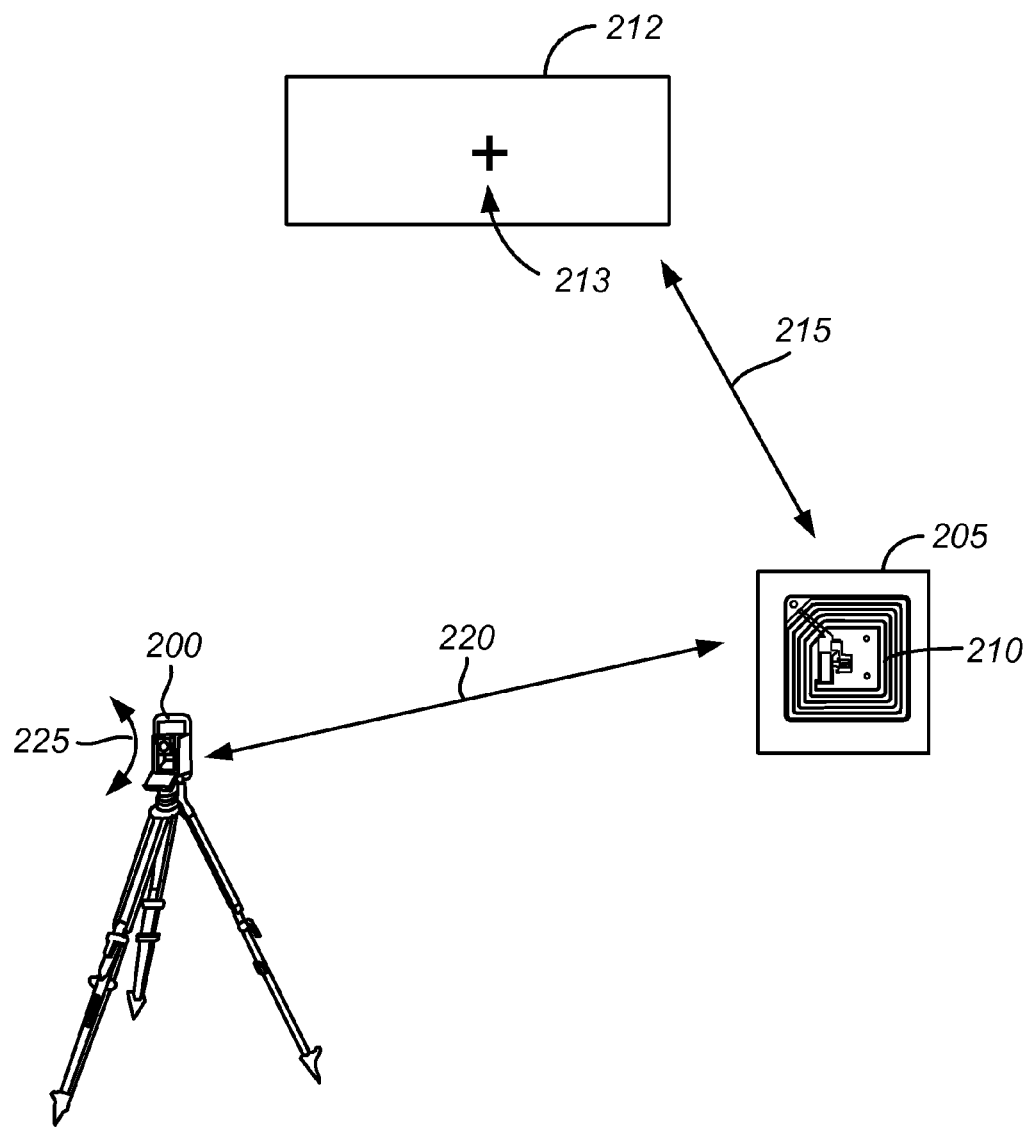
FIGS. 2A-2B depict embodiments of a system according to one or more embodiments of the invention.
Figure 2B:
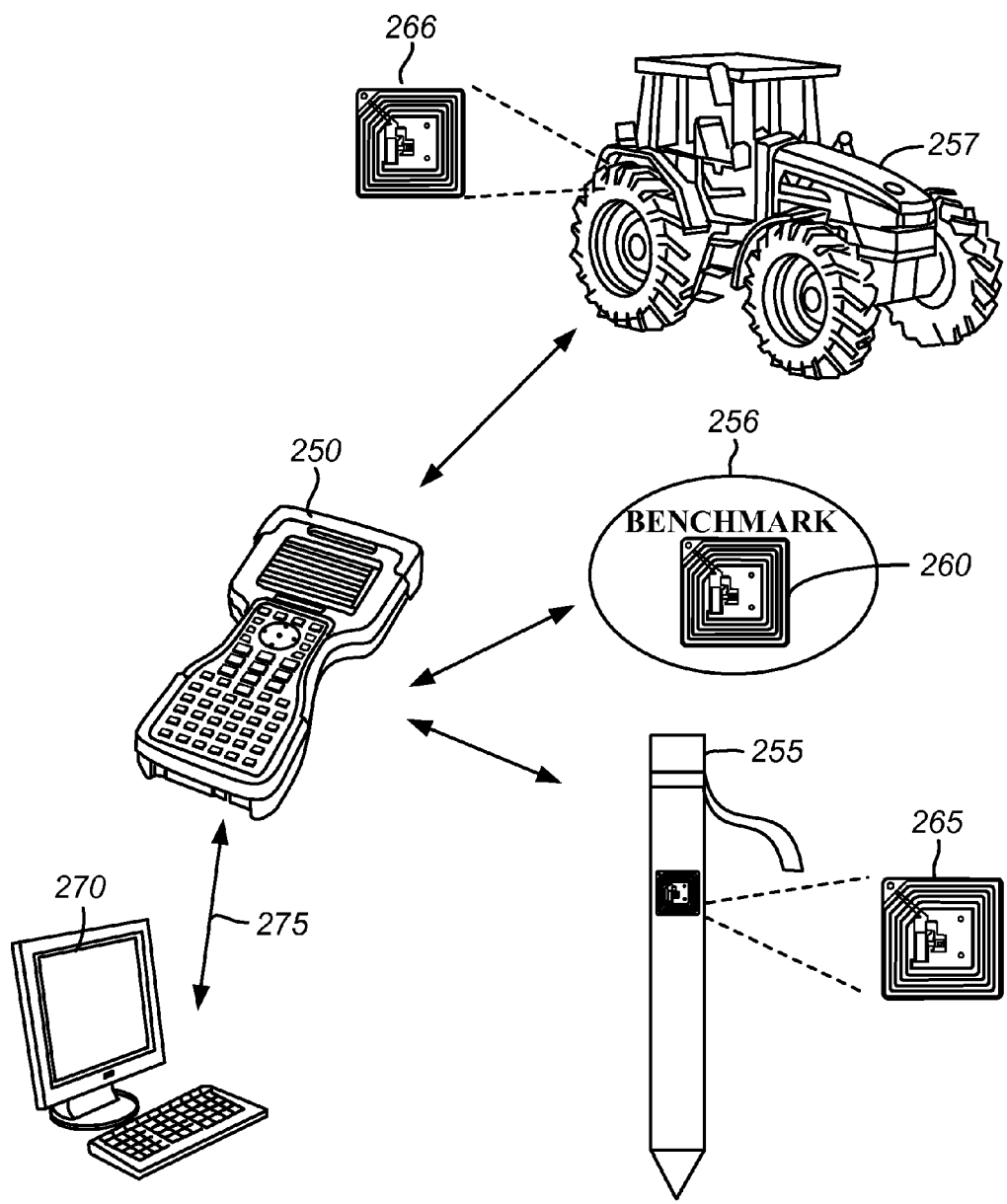

Referring now to FIGS. 2A-2B, graphical representations of the device of FIG. 1 are shown according to one or more embodiments of the invention. Referring first to FIG. 2A, an RFID tag detection device is shown as a total station according to one embodiment. Total station 200 may be configured to perform a surveying measurement and/or detect an RFID tag 210 associated with a position of interest 205. For example, total station 200 may be configured to determine a distance, shown as 220, from the total station to the position of interest 205. Further, total station 200 can determine an angular offset, shown as 225, to the position of interest in relation to total station 200. As shown in FIG. 2A, RFID tag 210 is depicted as including an antenna and a processor/memory. However, it may also be appreciated that RFID tag 210 can be any type of RFID tag. It should also be appreciated that RFID tag 210 can include data that may provide a reference to determine the orientation of RFID tag 210. As such, total station 200 can provide omni-directional decoding of RFID tags.

RFID tag 210 may be fixed or attached to an item. Data encoded in RFID tag 210 may include an identification and reference information for the item. According to another embodiment of the invention, total station 200 may be configured to detect an RFID tag 210 from a distance. Data encoded in RFID tag 210 may be decoded by total station 200 to provide an orientation of the total station. As such, total station 200 can then use decoded information to provide directional information to the user of the total station 200.

According to another embodiment, RFID tag 210 can provide a plurality of information types. For example, RFID tag 210 may include an identification number assigned by a surveying tool or a predefined identifier, such as a government issued benchmark number. Similarly, RFID tag 210 can include data about the previous surveying process such as a date or time when the RFID tag was encoded, the date that the point was last surveyed, the level of control (e.g., the ranking or authority level of a control point), a control point to which a measured point refers, geoid model information, the equipment used to perform the survey, the identity of the surveyor responsible for the measurement (e.g. name and/or license number), and the coordinate system used to perform the measurement (e.g. local coordinates or WGS84 space). The date value can be useful when determining a rate of movement for a position of interest. Latitude and longitude coordinates relating to global position data and/or latitude and longitude coordinates may further be decoded from an RFID tag. Additionally, RFID tag 210 may include reference information including data entered by a user related to the position of interest. For example, the location of a utility service in the vicinity of a surveying mark or the ranking or authority level of the control point may be indicated. In addition, information related to an item associated with the position of interest, such as whether the RFID tag is placed on a curb, a fence, or a survey stake may be stored in the RFID tag.

Total station 200 may include a position detection module (e.g., position detection module 117) configured to determine position data for the position of interest 205. In one embodiment, total station 200 may be configured to determine position data by employing Global Position Satellite (GPS) system data. Additional positioning satellite system data which may be employed includes GLONASS, Galileo, and Compass, the Global Navigation Satellite System (GNSS). Accordingly, total station 200 may include and/or relate to equipment manufactured by Trimble Navigation Limited, the assignee of this application, and include products designed for surveying applications and Geographical Information System (GIS) applications. Exemplary equipment which may be employed includes the Trimble™ S6, VX Spatial Station, and the family of GeoExplorers used in GIS applications. Other techniques employing a combination of terrestrial optical survey and satellite-based position determination are also well known in the arts. The following patents are incorporated by reference herein in their entirety: U.S. Pat. Nos. 5,471,218; 5,923,287; and 6,529,828.

According to another embodiment of the invention, total station 200 may be configured to perform a surveying measurement and/or detect an RFID tag 210 from a distance to reduce risk associated with performing a surveying measurement in a high risk site, such as earth movement. Further, RFID tag 210 may be produced at relatively low cost. In that fashion, monitoring a position of interest in a high risk site may be performed by total station 200.

Referring to FIG. 2A, the RFID tag 210 can include reference information embedded in the RFID tag. As an example, such reference information could include "offset" information related to two or more locations or points. For example, the RFID tag 210 could include information about the offset from the position of interest 205 to another position of interest 212 and a specific portion 213 of the other position of interest 212. Merely by way of example, the other position of interest 212 could be an object on which it is difficult to place an RFID tag or a barcode, for example, a dam with a specific feature, such as the top of the tower, being the specific portion 213. The offset 215 from the position of interest 205 to the other position of interest 212 or the specific portion 213 can be stored in RFID tag 210. In some embodiments, the offset 215 can be used for deformation monitoring for seismic events, or the like. Thus, embodiments of the present invention provide for storage of reference information in RFID tags that include an offset from the position of interest to a second position of interest. In some embodiments, the RFID tag can include reference information on more than one offset as appropriate to the particular application.

Alternatively, the offset embedded in the RFID tag 205 could be the offset to another target of interest, which can act as a type of guide post or aid to finding the next position of interest. In this embodiment, the offset may direct the surveying equipment or operator to the general area of an object using the reference information stored in the RFID tag, thereby serving as an aid in locating the subsequent position that is surveyed. Thus, embodiments of the present invention provide for the storage of reference information in an RFID tag that includes an offset from the position of interest to a target (e.g., specific portion 213) associated with a second position of interest (e.g., position of interest 212).

Referring now to FIG. 2B, device 250 is presented as another embodiment of a surveying tool 200. As shown in FIG. 2B, device 250 can detect an RFID tag associated with a variety of surveying markers. Device 250 is shown in FIG. 2B as being a field instrument which can be used to detect an RFID tag from close proximity according to one embodiment of the invention. As such, device 250 may include an RFID tag reader/writer (e.g., RFID tag scanner 105) configured to detect RFID tag 265 coupled to a surveying marker 255, RFID tag 260 coupled to a surveying mark 256 and/or RFID tag 266 coupled to a mobile machine 257. As shown in FIG. 2B, surveying marker 255 and surveying mark 256, are shown as a surveying stake and a benchmark, respectively. Mobile machine 257 is illustrated as a tractor, however, it should also be appreciated that mobile machine 257 can relate to other types of mobile devices and is not limited to tractors. It should also be appreciated that device 250 can detect RFID tags coupled to any type of surveying marker in general.

According to another embodiment, device 250 may relate to a Geographic Information System (GIS) unit which may be a handheld unit. In that fashion, one or more detected RFID tags may be decoded by device 250 wherein the decoded data may be used by one or more applications of the GIS.

Detection of RFID tags 260, 265 and/or 266 may be used to determine position of device 250 by decoding data associated with the RFID tags. According to another embodiment of the invention, device 250 can transmit information detected from RFID tags to a central processor 270 for collection and processing over communication link 275. Communication link 275 may be one of a wired or wireless data link. Device 250 may further be configured to store data for items such as surveying marker 255, surveying mark 256, and/or mobile machine 257.

According to another embodiment of the invention, surveying tool 200 may be configured to detect RFID tags of various storage capacities. The following table provides exemplary values of the maximum number of characters which can be encoded by RFID tag 210 according to one embodiment of the invention. While the values presented relate to an exemplary maximum number of characters encoded by RFID tag data, it may be appreciated that RFID tag 210 may be decoded with less characters. It should also be appreciated that surveying tool 200 could decode an RFID tag having data exceeding the exemplary values.

| RFID TAG CAPACITY (EXEMPLARY) | |
| --- | --- |
| Numeric | 7,089 characters |
| Alphanumeric | 4,296 characters |
| Binary (8 bits) | 2,953 characters |
| Kanji, full-width Kana | 1,817 characters |

According to another embodiment of the invention, surveying tool 200 may be configured to detect RFID tag 210 from a distance. Data encoded within RFID tag 210 may be used for orientation of surveying tool 200. As such, surveying tool 200 can use data encoded by RFID tag 210 to provide directional information to the user of the surveying tool 200.

Figure 3A:
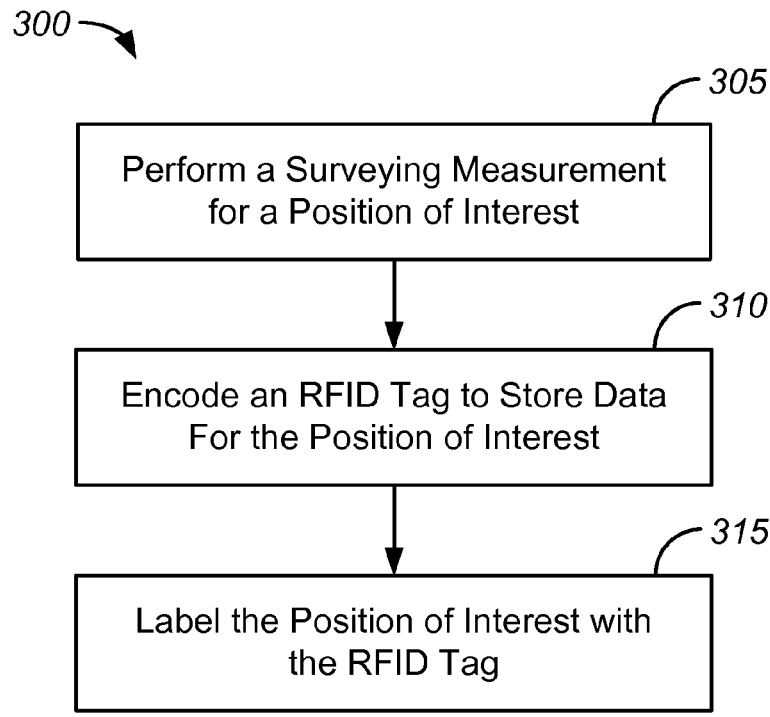
FIGS. 3A-3C depict processes according to one or more embodiments of the invention.
Figure 3B:
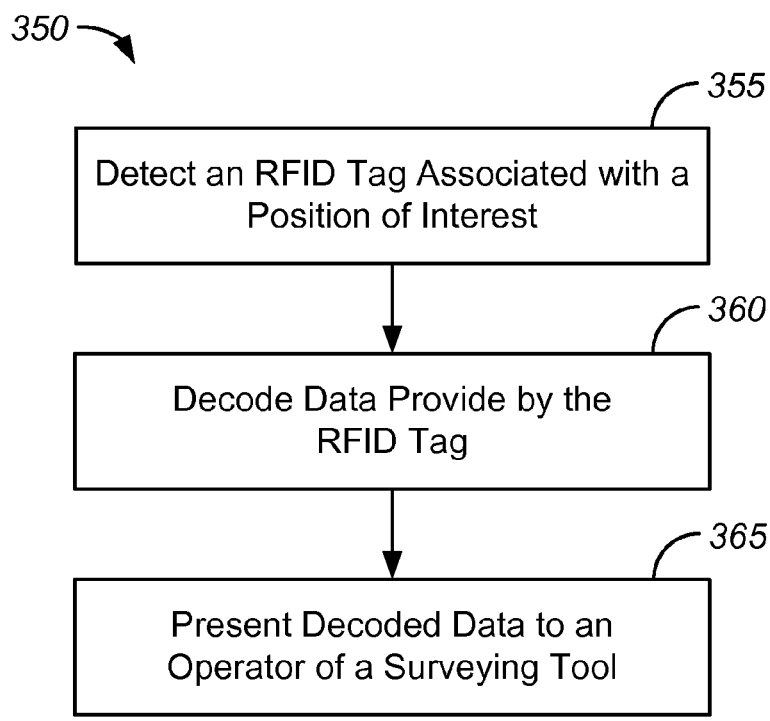
Figure 3C:
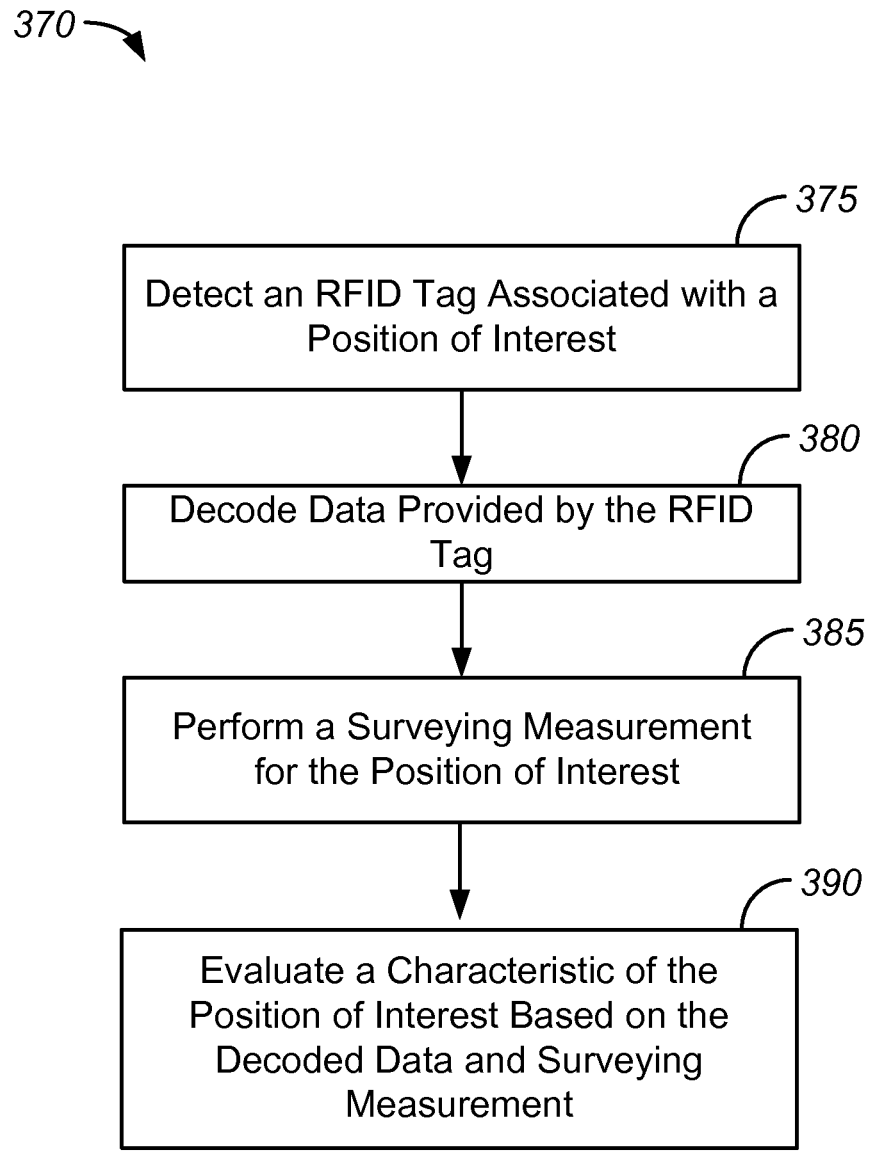

Referring now to FIGS. 3A-3C, processes are shown according to one or more embodiments of the invention. Referring first to FIG. 3A, process 300 is shown for labeling a position of interest with an RFID tag. Process 300 may be initiated by performing a surveying measurement for the position of interest (e.g., position of interest 205), at block 305, by a surveying tool (e.g., surveying tool 100). Measurement data may be encoded using an RFID tag at block 310. The RFID tag may be encoded to store measurement data and/or user provided data as described below with more detail with respect to FIG. 4. Process 300 may further include labeling a position of interest with the RFID tag at block 315.

Referring now to FIG. 3B, process 350 is shown for decoding RFID tag data according to one embodiment of the invention. Process 350 may be initiated with detection of an RFID tag associated with a position of interest, at block 355, by a surveying tool (e.g., surveying tool 100). The RFID tag may be detected by transmitting an RF interrogation signal and receiving an RF response signal. Data encoded in the RFID tag may be decoded by the RFID tag scanner in block 360. Decoded data may be stored in a memory (e.g., memory 140). The decoded data may be presented by a surveying tool display (e.g., display 130) in block 365.

Referring now to FIG. 3C, process 370 is shown for monitoring a position of interest according to one embodiment of the invention. Process 370 may be initiated by detecting an RFID tag associated with a position of interest, in block 375, by a surveying tool (e.g., surveying tool 100). The RFID tag may be decoded at block 380 by the surveying tool. A surveying measurement can be performed for the position of interest at block 385 to determine an elevation, grade or spatial position of the position of interest. The surveying measurement may be compared to data decoded from the RFID tag to determine any movement or changes associated with the position of interest. In that fashion, process 370 may be used to monitor earth movement.

Figure 4:
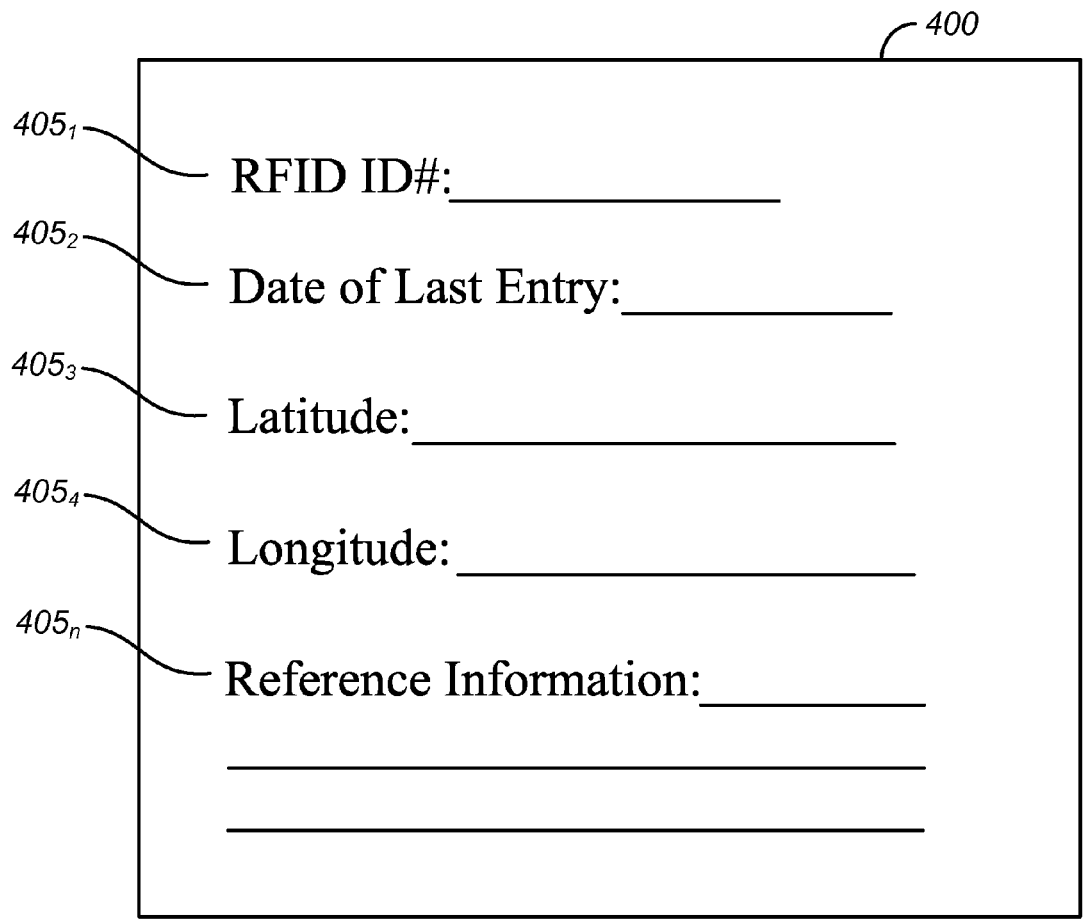
FIG. 4 depicts a graphical representation of surveying data according to one embodiment of the invention.

FIG. 4 depicts a simplified graphical representation of data that may be encoded in an RFID tag associated with a position of interest according to one or more embodiments of the invention. Data encoded using an RFID tag (e.g., RFID tag 210) is graphically shown as data element 400 in FIG. 4. Data element 400 may include a plurality of fields associated with a position of interest. In one embodiment, data element 400 may be encoded in an RFID tag to include an identification number $405_1$, date of entry $405_2$, latitude coordinate $405_3$, longitude coordinate $405_4$ and reference information $405_n$. Identification number $405_1$ may relate to an identification number assigned by a surveying tool (e.g., surveying tool 100). However, it may also be appreciated that identification number $405_1$ may correlate to a predefined identifier, such as a government issued benchmark number.

The date of entry field $405_2$ may relate to a time and/or date that the RFID tag is encoded with data. As such, date of entry field $405_2$ can be useful when determining a rate of movement for a position of interest. Latitude and longitude elements $405_3$ and $405_4$ may relate to a global position data as determined by a surveying tool (e.g., surveying tool 100). Alternatively, latitude and longitude elements $405_3$ and $405_4$ may be received from a global positioning system (GPS) receiver.

Reference information field $405_n$ (which can also be referred to as a feature information field) can be used for entering data by a user of the system related to the position of interest. For example, the location of a utility service in the vicinity of a surveying mark may be indicated. Further the reference information field $405_n$ can be a user provided description for the position of interest. According to another embodiment, reference information field $405_n$ may contain information regarding the absolute and/or relative position of other positions of interest, relative to the position of interest, such as a separation between the RFID tag and one or more optical targets. For example, reference information field $405_n$ could contain position data of the next position of interest that the surveying tool may locate and measure. In that fashion, location of position of interest may be facilitated and time required to locate the point of interest may be reduced. Data element 400 has been described in FIG. 4 as having a plurality of data elements (e.g., up to n elements), however, it may be appreciated that a single field may be encoded into the RFID tag. Additionally, other information can be stored in the RFID tag and such information is not limited to the information illustrated in FIG. 4. Additional description related to information that can be stored in RFID tags is provided in U.S. patent application Ser. No. 13/225,003, which is hereby incorporated by reference in its entirety for all purposes.

As illustrated in FIG. 4, a variety of data can be encoded in the RFID tag, which is associated with a position of interest according to one or more embodiments of the present invention.

Figure 5:
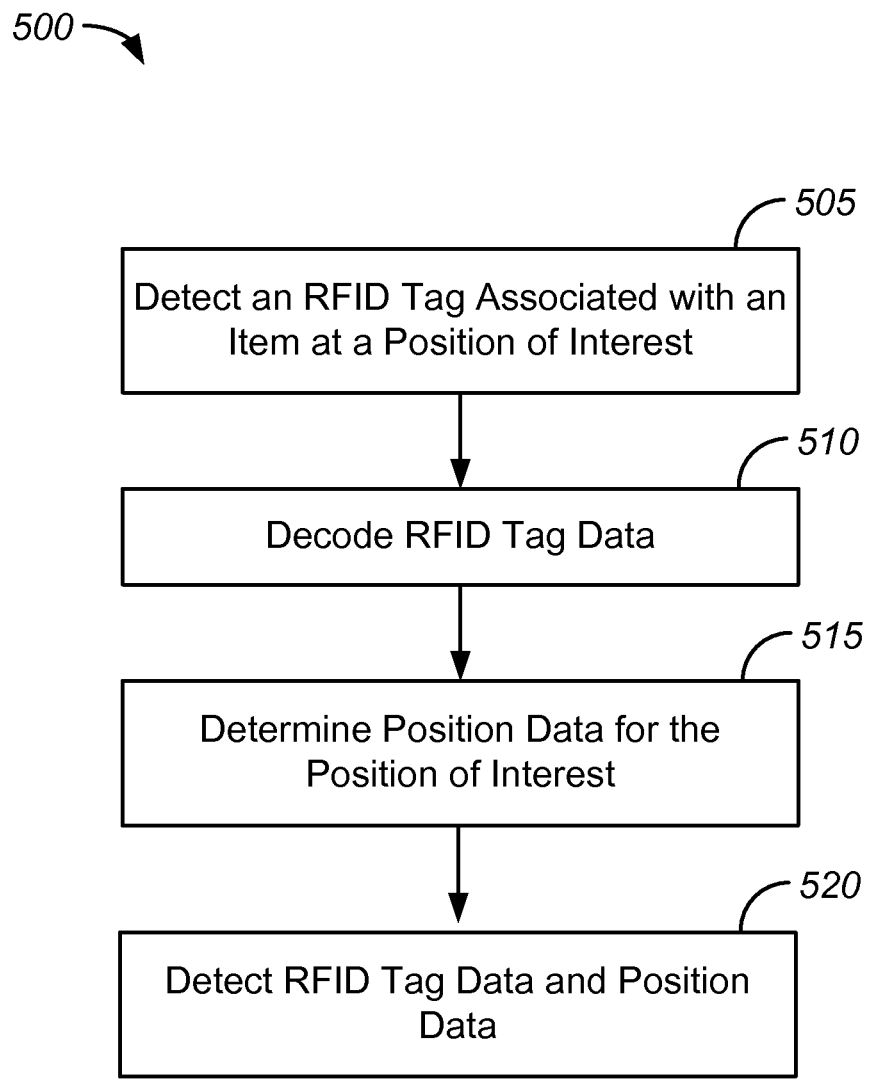
FIG. 5 depicts a process according to one or more embodiments of the invention.

Referring now to FIG. 5, a process is shown for detecting RFID tag data according to one or more embodiments of the invention. Process 500 is shown for decoding RFID tag data according to one embodiment of the invention. Process 500 may be initiated with detection of an RFID tag associated with an item located at a position of interest, at block 505, by an RFID tag reader/writer (e.g., RFID tag scanner 105). Data encoded in the RFID tag may be decoded at block 510. Decoded data may be stored in a memory (e.g., memory 140). At block 515, the device can determine position data for the position of interest. In one embodiment, position data may be determined by performing at least one of a surveying measurement and global positioning measurement. Position data can relate to one or more of location coordinates, elevation, grade, GNSS position data, surveying data and global position data. In certain embodiments, a surveying measurement can be performed for the position of interest at block 515 to determine an elevation, grade or spatial position of the position of interest. The surveying measurement may be compared to data decoded from the RFID tag to determine any movement or changes associated with the position of interest. In that fashion, process 500 may be used to monitor earth movement and/or equipment movement. The decoded data and position data may be presented by a display (e.g., display 130) in block 520.

Figure 6:
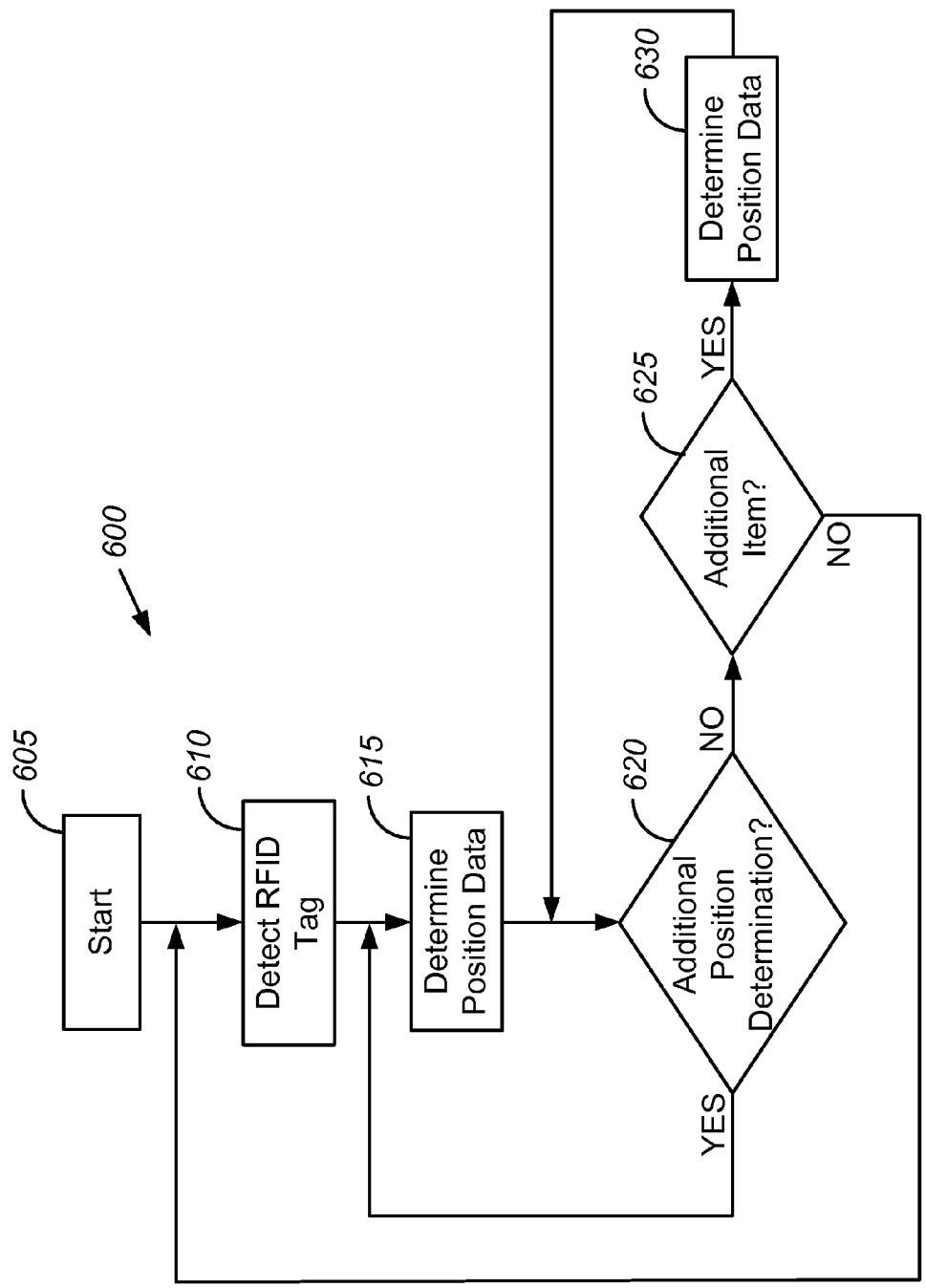
FIG. 6 depicts a process according to one or more embodiments of the invention.

Referring now to FIG. 6, a process is depicted for detecting RFID tag data of at least one item of interest according to one or more embodiments of the invention. Process 600 may be initiated at start block 605 by a user to for a target area. At block 610 an RFID tag detection device (e.g., device 100) can detect one or more RFID tags for a target area. The device proceeds to determine position data at block 615. At decision block 620, the device can check if additional position data is to be determined. Additional position data may be determined for an item based on one or more user and/or device settings. In that fashion, process 600 can monitor movement of one or more items. When additional position data is to be corrected ("YES" path out of decision block 620), the device can determine position data at block 615. When additional position data is not required ("NO" path out of decision block 620), process 600 proceeds to check if additional items require analyzing at decision block 625.

In one embodiment, the device may prompt a user when multiple RFID tags are detected in a target area. When process 600 detects an additional RFID tag, ("YES" path out of decision block 625), the device can determine position data at block 630. When no additional RFID tags are detected, ("NO" path out of decision block 625), process 600 can search another target area. In addition to RFID tags, barcode targets can be detected and data from the barcode targets can be decoded and combined with information obtained using the RFID tags described herein.

Figure 7:
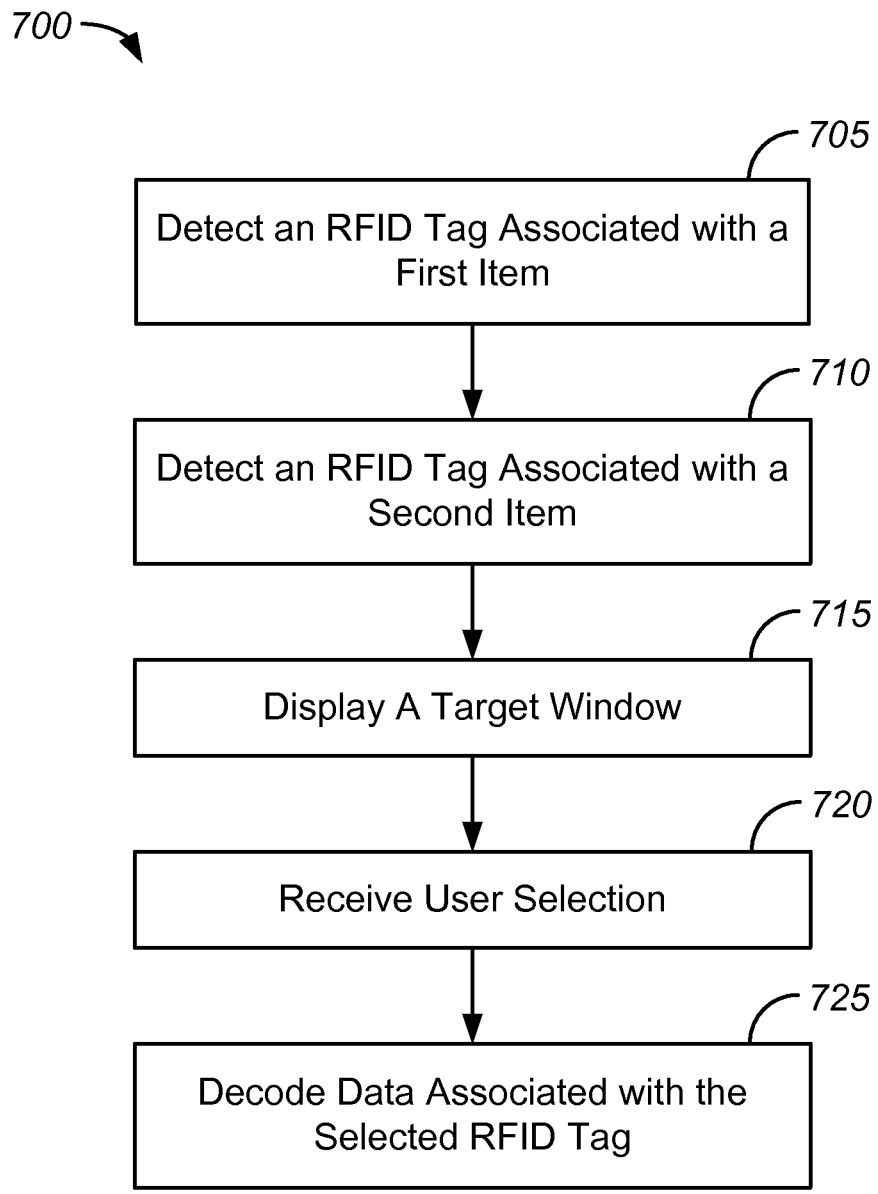
FIG. 7 depicts a process according to one or more embodiments of the invention.

Referring now to FIG. 7 a process is depicted for selecting an RFID tag according to one embodiment of the invention. Process 700 may be employed by a RFID tag detection device (e.g., device 100) when a plurality of RFID tags are detected in a target area. For example, process 700 may be performed by one or more of a total station and GIS configured to detect one or more RFID tags. Process 700 may be initiated by detecting an RFID tag associated with a first item at block 705. Process 700 may detect an RFID tag associated with a second item at block 710. The device can display one or more of a listing and graphical representation of the RFID tags. At block 715, the device can display a target window identifying one of the RFID tags. The device may be configured to receive user input for selection of an RFID tag at block 720. At block 725, the device can decode data of a selected RFID tag. Process 700 may further include displaying decoded RFID tag information and position data for one or more RFID tags. In certain embodiments, one or more devices, such as a total station and GIS, may be programmed to operate according to process 700.

Figure 8:
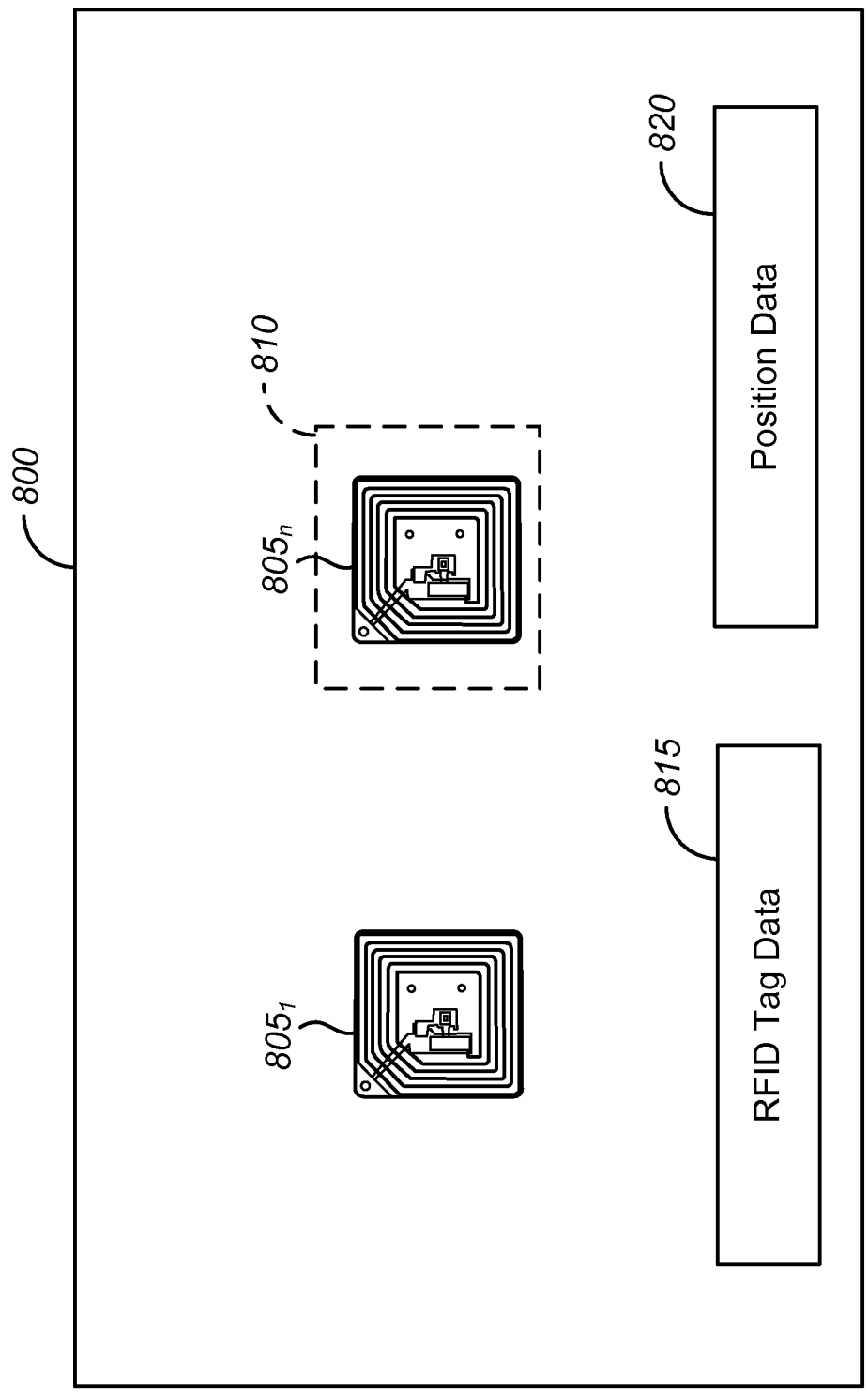
FIG. 8 depicts a graphical representation of a display window according to one embodiment of the invention.

Referring now to FIG. 8, a graphical representation of a device display window is depicted according to one embodiment of the invention. Display window 800 may be displayed by a device (e.g., device 100). Display window 800 may provide information including images related to RFID tags $805_1$ and $805_2$ and decoded RFID tag data 815 and position data 820. Display window 800 may further display target window 810 identifying an RFID tag. The display (e.g., display 130) may be configured to select one or more RFID tags within target window 810 based on user input and/or device settings. Although RFID tags $805_1$ and $805_2$ are shown as graphical representations in FIG. 8, it should also be appreciated that display window may provide RFID tags $805_1$ and $805_2$ as a list.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners. The scope of the invention should, therefore, be determined with reference to the appended claims along with their full scope of equivalents.

What is claimed is:

1. A method of surveying, the method comprising:
  determining a location of a surveying tool;
  using the surveying tool to determine a location of a position of interest based, at least in part, on the location of the surveying tool;
  using the surveying tool to detect an RFID tag associated with the position of interest;
  using the surveying tool to decode information stored in the RFID tag to extract surveying data associated with the position of interest, wherein the surveying data associated with the position of interest comprises information stored during a previous survey; and
  presenting the location of the position of interest and the surveying data associated with the position of interest to an operator of the surveying tool.

2. The method of claim 1 wherein the surveying data comprises GNSS data.

3. The method of claim 2 wherein the GNSS data comprises GPS data.

4. The method of claim 1 wherein the surveying data associated with the position of interest relates to one of an elevation, grade, global position, or surveying measurement in general.

5. The method of claim 1 wherein the surveying data associated with the position of interest relates to reference information for the position of interest.

6. The method of claim 1 wherein the surveying data associated with the position of interest identifies at least one of: a person who performed the previous survey, a date on which the previous survey was performed, a type of object associated with the position of interest, equipment used to perform the previous survey, a geoid model, a location of a control point, or a surveying method.

7. The method of claim 1 wherein presenting the surveying data associated with the position of interest includes displaying the surveying data on a display of the surveying tool.

8. The method of claim 1 further comprising labeling the position of interest with the RFID tag.

9. The method of claim 1 further comprising evaluating a characteristic of the position of interest based, at least in part, on the location of the position of interest and the surveying data associated with the position of interest, wherein evaluating a characteristic of the position of interest includes comparing the location of the position of interest to the surveying data associated with the position of interest.

10. The method of claim 1 further comprising storing updated surveying data in the RFID tag.

11. A surveying tool comprising:
a display;
a position detection module configured to determine a location of the surveying tool;
an RFID tag scanner configured to detect an RFID tag associated with a position of interest; and
a processor coupled to the display, the position detection module, and the RFID tag scanner, the processor configured to:
determine a location of the position of interest based, at least in part, on the location of the surveying tool;
decode information stored in the RFID tag to extract data associated with the position of interest; and
present the location of the position of interest and the data associated with the position of interest on the display;
an RFID tag writer configured to store updated data in the RFID tag.

12. The surveying tool of claim 11 wherein the data associated with the position of interest relates to one of an elevation, grade, or global position.

13. The surveying tool of claim 11 wherein the data associated with the position of interest relates to reference information for the position of interest.

14. The surveying tool of claim 13 wherein the reference information comprises at least one of an offset from the position of interest to a second position of interest or an offset from the position of interest to a target associated with a second position of interest.

15. The surveying tool of claim 11 wherein the data associated with the position of interest comprises information stored during a previous survey that identifies at least one of: a person who performed the previous survey, a date on which the previous survey was performed, a type of object associated with the position of interest, equipment used to perform the previous survey, a geoid model, a location of a control point, or a surveying method.

16. The surveying tool of claim 11 further comprising an angle sensor and a distance sensor coupled to the processor, wherein the processor is further configured to determine the location of the position of interest based, at least in part, on output signals from the angle sensor or the distance sensor.

17. The surveying tool of claim 11 wherein the processor is further configured to evaluate a characteristic of the position of interest based, at least in part, on the location of the position of interest and the data associated with the position of interest, wherein evaluating a characteristic of the position of interest includes comparing the location of the position of interest to the data associated with the position of interest.

18. The surveying tool of claim 11 wherein the processor is further configured to store updated data in the RFID tag.

19. A method of surveying using a surveying tool, the method comprising:
detecting an RFID tag associated with an item located at a position of interest using the surveying tool;
decoding the RFID tag to extract data associated with the item using the surveying tool;
determining a location of the surveying tool;
determining position data for the position of interest using the surveying tool, the position data based, at least in part, on the location of the surveying tool; and
displaying the data associated with the item and the position data for a user.

20. The method of claim 19 wherein the data associated with the item of interest includes at least one of an identification of the item and reference information associated with the item.

21. The method of claim 19 wherein the position data relates to at least one of location coordinates, elevation, grade, Global Navigation Satellite Systems (GNSS) position data, surveying data, or global position data.

22. The method of claim 19 wherein determining position data comprises performing a surveying measurement.

23. The method of claim 19 wherein decoding the RFID tag comprises interrogating the RFID tag using an RFID tag scanner.

24. The method of claim 19 further comprising generating a data record for the item of interest including the data associated with the item and the position data.

25. The method of claim 19 further comprising determining position data for a second position of interest associated with the item and displaying the position data for the second position.

26. The method of claim 19 further comprising detecting a second RFID tag associated with a second item and determining position data for the second RFID tag.

27. The method of claim 19 further comprising displaying a target window the display to mark the RFID tag.

28. The method of claim 19 further comprising receiving a user selection and decoding the RFID tag based on the user selection.

29. The method of claim 19 wherein detecting an RFID tag relates to detection of the RFID tag located a distance within a range of 1 to 150 feet.

30. The method of claim 19 further comprising transmitting at least one of the data associated with the item located at the position of interest or the position data for the position of interest over a wireless link.

31. The method of claim 19 further comprising monitoring earth movement based on at least one of the data associated with the item located at the position of interest or the position data for the position of interest.

32. A device configured for RFID tag detection comprising:
a display;
a radio frequency receiver configured to detect an RFID tag associated with an item located at a position of interest;
a first position detection module configured to determine a location of the device;
a second position detection module configured to determine position data for the position of interest;
a radio frequency transmitter configured to store data in the RFID tag associated with the item located at the position of interest; and a processor coupled to the display, the first position detection module, and the second position detection module, wherein the processor is configured to:
  determine the position data for the position of interest based, at least in part, on the location of the device;
  decode the RFID tag to extract data associated with the item;
  output the data associated with the item and the position data to the display; and
  store updated data in the RFID tag.

33. The device of claim 32 wherein the data associated with the item of interest includes at least one of an identification of the item and reference information associated with the item.

34. The device of claim 33 wherein the reference information comprises an offset from the position of interest to a second position of interest.

35. The device of claim 33 wherein the reference information comprises an offset from the position of interest to a target associated with a second position of interest.

36. The device of claim 32 wherein the position data relates to at least one of location coordinates, elevation, grade, Global Navigation Satellite Systems (GNSS) position data, surveying data, or global position data.

37. The device of claim 32 wherein the first position detection module performs a global positioning measurement.

38. The device of claim 32 wherein the processor is further configured to generate a data record for the item of interest including the data associated with the item and the position data.

39. The device of claim 32 wherein the display is configured to display a target window to mark the RFID tag.

40. The device of claim 32 wherein the processor is further configured to receive a user selection and decode the RFID tag based on the user selection.

41. The device of claim 32 wherein the device relates to at least one of a total station or a handheld geographic information system.

42. The device of claim 32 wherein detection of an RFID tag relates to detection of the RFID tag located a distance within a range of 1 to 150 feet.

43. The device of claim 32 wherein the device is further configured to transmit at least one of the data associated with the item located at the position of interest or the position data for the position of interest over a wireless link.

44. The device of claim 32 wherein the device is further configured to monitor earth movement based on at least one of the data associated with the item located at the position of interest or the position data for the position of interest.

* * * * *